3,427,131
METHOD OF PREPARING TETRABORON-
SILICIDE ($B_4Si$)
Vlado I. Matkovich, Youngstown, N.Y., and Ervin Colton, Wauwatosa, Wis., assignors to Allis-Chalmers Manufacturing Company, Milwaukee, Wis.
Continuation-in-part of application Ser. No. 50,912, Aug. 22, 1960, which is a division of application Ser. No. 820,886, June 17, 1959. This application Apr. 13, 1964, Ser. No. 360,477
U.S. Cl. 23—204            4 Claims
Int. Cl. C01b 35/00, 33/00

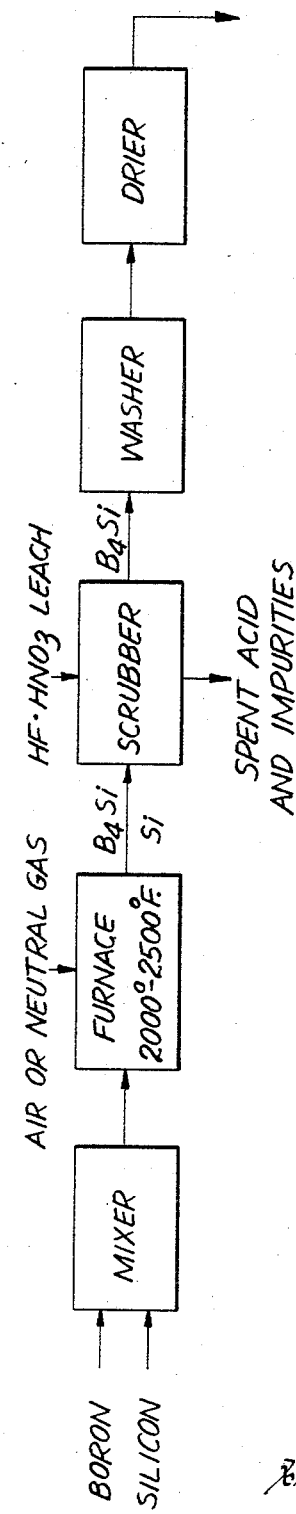

ABSTRACT OF THE DISCLOSURE

A method of making tetraboronsilicide, $B_4Si$, wherein the elemental constituents, in a finely divided state, are mixed together in a ratio of at least one part silicon for four parts boron. The mixture has a brownish color. The mixture is then heated to a temperature of at least 2000° F., but below 2550° F. for a period of from 2 to 8 hours. When the brownish color disappears, the mixture has formed into tetraboronsilicide.

---

This application is a continuation in part of our application, Ser. No. 50,912, now abandoned, which was a divisional application of Ser. No. 820,886, now U.S. Patent 3,138,468.

One of the prime motivations leading to this invention was our desire to provide compounds of such a chemical composition and such physical structure that they will be highly useful for applications where oxidation resistance is required and highly refractory properties are desired such, for example, for forming brick linings in blast furnaces.

It was a further desire to examine boron-silicon compounds to determine if a boron silicide could be found which is superior in quality to the species heretofore known and which in its final form is sufficiently free from contaminating ingredients and will have such a crystal structure and such a chemical composition so that the compound will be highly useful in many ways.

Having succeeded in finding such a new compound, as disclosed in our aforementioned copending application, it became another object of the present invention to provide a simple, economical and feasible method of making the new compound.

These and other objects as shall hereinafter appear are fulfilled by the present invention and discovery in a manner easily discerned from the following detailed description, particularly when considered in conjunction with the accompanying drawing which illustrates a schematic flow sheet of a method of preparing $B_4Si$ in accordance with the present invention.

As shown in the accompanying drawing, elemental silicon and elemental boron react readily in the temperature range of at least about 2000° F. to about 2550° F. to form $B_4Si$. However, at temperatures from 2500 to 2550° F. other forms of boron silicide may also be formed. Therefore, in assuming that only $B_4Si$ is formed, it is necessary that the reaction be effected at temperatures above 2000° F. and below 2500° F.

One practice of the present invention comprises mixing elemental boron with elemental silicon so that there is a slight molar surplus of silicon for practical reasons which shall hereinafter become apparent. The mixture is characterized by a brownish to a brownish-black color.

It is found that silicon powder of 97% purity and of a size about minus 100 mesh may be used in the practice of this invention with desirable results. It should be noted, however, that particle size is not critical to the invention although fine material will react at a faster rate than coarser material due to greatly increased surface exposed for reaction. The purity of the silicon used also is not critical to achieving the desired reaction. Of course, the purer the reactants, the better the product. Amorphous boron powders of both 95–97% and of 85–88% purity have been used in the practice of this invention with equally satisfactory results. It was found, however, that when the less pure material is used, more should be used in order to fulfill the molar requirements for each element present. The particle size of the amorphous boron used was about minus 200 mesh although this again is not critical.

The elemental boron and silicon are mixed and placed into resistant containers. Containers of ordinary fire clay are quite satisfactory.

One mixture which gives excellent results consists of 1.3 parts of silicon to 1 part of boron (on a 100% pure basis) by weight, which are thoroughly mixed together.

The mixture in the resistant container is then fed into a suitable furnace such, for example, as an electric resistance furnace, where it is heated to a temperature of at least about 2000° F. to less than 2500° F, either by prefiring or concurrent firing of the furnace. It is probably generally preferable to prefire the furnace to enable the more expeditious processing of the materials although it is not imperative that it be so done. Thus, an equally desirable product is obtained when the mixture is charged into a cool furnace which is subsequently fired. It is important that the temperature of the charge not be permitted to reach 2500° F. because at temperatures of 2500° F. and higher other forms of boron silicide may be formed.

The furnace may be provided with an inert atmosphere by conventional feed and withdrawal means (not shown) although the increased purity attendant the use of a controlled atmosphere does not warrant such measures except for special occasions. Heating in an air atmosphere provides a commercially satisfactory product which, while containing from a trace to about 2% of foreign matter such, for example, as boron nitride, possesses substantially all of the attributes of the pure $B_4Si$.

The charge is maintained in the furnace for a period of time ranging from about two to about eight hours which is sufficient to obtain a substantially complete reaction between the silicon and the boron. The duration of the heating step for a given mixture is, of course, dependent upon a number of variables including the amount of the material charged, the size of the particles in the charge and the actual temperature at which the furnace is operated.

When the reaction product has been formed, that is, the boron-silicon reaction is chemically substantially complete, the product is removed hot from the furnace, is cooled, and is then transferred to a suitable cleaning device such as a scrubber.

In the cleaning device, the product encounters a suitable leach solution such, for example, as a nitric-hydrofluoric acid solution or other hydrofluoric-oxidizing acid solutions, which, by slightly agitated engagement with the product, extracts the unreacted silicon therefrom. The leach solution may be any silicon-avid solution, that is silicon dissolving solution, such as the above mentioned oxidizing hydrofluoric acid solution or strong caustic solutions. Such silicon-avid solutions are well known in the art. The spent leach liquor, which now contains substantially all of the excess silicon from the furnace product, is drained from the scrubber. The leached $B_4Si$ is passed through a washer where water or other suitable solvent is employed to remove any remaining leach solution from the $B_4Si$ particles. After washing, the $B_4Si$ is dried in a suitable drier which dispels any residual water therefrom. The product is then ready for use.

It was previously mentioned that it is desirable to provide at least a slight molar excess of silicon in the original charge. This is based upon the practical consideration that it is much easier to remove unreacted silicon from a reaction mixture than it is to remove unreacted boron. Therefore, to obtain a substantially complete reaction between silicon and boron at a readily attainable and convenient temperature and to provide a reaction product from which excessive reagent may be easily removed, a reaction mixture consisting of 1.3 parts of silicon to 1 part of boron by weight (a molar ratio of Si:2B) is very satisfactory.

As the mixture of boron and silicon are heated in air, a glassy coating forms around the mass. However, the specified temperatures provide adequate heat to penetrate the entire mass, and the coating has no significant effect on the reaction of the components other than to protect the newly formed $B_4Si$ from oxidation.

Since silicon attacks most containers, it is ideal to place the mixture in a container formed of boron nitride for introduction into the furnace although for the economies of commercial production, common fire clay crucibles are quite satisfactory. When the reaction of boron and silicon is carried out in air, some small amount of boron nitride impurity may be included in the product, but this trace quantity is found to have no significant effect on the $B_4Si$ product.

Upon removal from the furnace, the reaction mass consists of a black, glassy coating around a grayish, friable core. The coating is removed easily, and the inner core containing the reacted mass is purified by the acid leaching, washed and dried, as previously described, to give the desired $B_4Si$ product.

To aid in a fuller understanding of the present invention, Table I below presents representative data compiled by the practice of the present invention.

TABLE I.—PREPARATION OF BORON SILICIDE AT LESS THAN 2,500° F.

| Example: | Charge, grams | Heating Time, hours | X-ray Results of Product |
|---|---|---|---|
| 1 | 50 | 2 | Si+B⁴Si |
| 2 | 78 | 2 | Si+B⁴Si |
| 3 | 52 | 8 | Si+B⁴Si |
| 4 | 204 | 3 | Si+B⁴Si |

The product, when the reaction is complete, has a gray to black coloring depending on the amount of unreacted silicon present (silicon gives the product a gray color while the substantially pure $B_4Si$ is black). Elemental boron, however, is brown in color. Therefore, if the product still has a brownish color, this is an indication that there is still unreacted boron in the charge and thus the reaction is incomplete and the product should be fired further. Accordingly, the color change from brown to black or gray serves as an excellent timing guide to determine when the reaction is complete. As indicated above, this color change should be observable within a period of from two to eight hours.

The chief impurity present when practicing this invention by heating a mixture of 1.3 parts of silicon with 1 part of boron at a temperature slightly less than 2500° F. in air is silicon. Silicon, however, is readily removed by leaching the reaction product with a leach solution consisting of a mixture of nitric and hydrofluoric acids. Although other of the conventional methods for removing silicon may be used, the acid combination described here is most convenient. The leach solution may be prepared by mixing nitric acid (70% by weight) with hydrofluoric acid (48–52% by weight) in the proportion of about 3 parts hydrofluoric to about 1 part nitric (by weight). The solution may be stored in a suitable container formed of a material which is inert to the mixture such, for example, as plastic or stainless steel. The acid leach solution should be kept at about 68° F. while it is in use in the scrubber. For this reason, it is important to cool the furnace product as in air before introducing it to the scrubber. If hot furnace product and/or hot leach solution are engaged during the purification procedure, undesirable oxidation products are brought into the final $B_4Si$ product. Thus, in the scrubber, the cool acid solution is stirred mechanically and the powdered reaction product is introduced into its presence at a rate which avoids undue heat. Long standing, that is, several hours, of the furnace product in the acid solution should be avoided because $B_4Si$ will oxidize and dissolve. The significance of this is that when the process is to be interrupted for an undue length of time such, for example, as over a weekend, the scrubber should be drained of all product material. The purification is considered complete when evolution of brown fumes cease.

The "scrubbed" product from the scrubber is next directed to a washer which may contain a suitable filter unit which combines to filter and flood any remaining leach solution from the product. The purified $B_4Si$ is dried and the process is complete. The $B_4Si$ product is found by chemical analysis to have a boron-to-silicon ratio of about 3.7 (theoretical is four).

Various amounts of silicon may remain admixed with the purified $B_4Si$ depending on how efficiently the purification is carried out. Pure $B_4Si$ is strong and hard in crystalline form. Pure $B_4Si$ in powdered form possesses excellent oxidation resistance when heated in air. If the amount of free silicon admixed with $B_4Si$ is considerable, for example, about 25% by weight, the combination of $B_4Si$ plus silicon exhibits some plasticity when shaped and heated in air to about 1800° F. The less free silicon, the less the plasticity and the higher the temperature of softening. However, the oxidation resistance of $B_4Si$ silicon bodies decreases as the free silicon content increases.

$B_4Si$ can also be prepared successfully in accordance with this invention by reacting boric oxide ($B_2O_3$) or boric acid ($H_3BO_3$) with silicon. Thus, the reagents are mixed in accordance with the equations:

(1) $\quad 2B_2O_3 + 4Si \rightarrow B_4Si + 3SiO_2$
(2) $\quad 4H_3BO_3 + 4Si \rightarrow B_4Si + 3SiO_2 + 6H_2O$ In both cases, the charges were placed in an electric furnace which was heated to a temperature approaching 2500° F. and kept there for about one to three hours. After the charge has been so fired, the product may be removed hot and air cooled, or the power to the furnace may be shut off and the product furnace cooled. In all cases, analysis by X-ray powder diffraction revealed that $B_4Si$ is formed having a boron-to-silicon ratio of about 3.7.

It is, of course, understood that the embodiments herein described and illustrated are presented to exemplify the present invention rather than to limit it, and such alterations, modifications and applications as may readily occur to the skilled artisan are intended within the spirit of this invention, especially as it is defined by the claims appended hereto.

The embodiments of the invention for which an exclusive property or privilege is claimed are defined as follows:

1. The method of making tetraboronsilicide comprising: mixing elemental boron with a molecular excess of elemental silicon to form a charge having a brownish color; heating said charge to a temperature of from about 2000° F. to less than 2500° F. until said brownish color disappears; cooling said charge; leaching said charge in a silicon-avid solution to dissolve unreacted silicon therefrom; and washing said solution and dissolved silicon therefrom.

2. The method of making tetraboronsilicide comprising: mixing elemental silicon and elemental boron in approximately molecular equivalents to form a charge having a brownish color; heating said charge to a temperature of 2000° F. to less than about 2500° F. for a period of from two to eight hours until said brownish color disappears; and cooling said charge.

3. The method of making tetraboronsilicide comprising: forming a mixture of silicon and boron, said mixture having a boron-to-silicon ratio of not more than four; heating said charge in an atmosphere of a gas, selected from the group consisting of the inert gases and air, to a temperature of at least about 2000° F. and less than 2500° F. for a period of from two to eight hours until substantially all of said boron has reacted with said silicon; cooling the reacted charge; leaching said reacted charge with a silicon-avid solution of about 3 parts hydrofluoric acid to about 1 part nitric acid to remove substantially all unreacted silicon therefrom; washing said leached product with water to remove substantially all of said solution and dissolved silicon therefrom; and drying said product to dispel substantially all of said water therefrom.

4. The method of making tetraboronsilicide comprising: heating a mixture of boron and silicon having a slight molecular excess of silicon to a temperature between 2000° F. and less than about 2500° F. for a period sufficient to react all of said boron with said silicon; cooling said reaction product; and extracting all of the unreacted silicon from said product by dissolving said silicon with a silicon-avid solution and washing said solution and dissolved silicon from the product.

References Cited

UNITED STATES PATENTS 3,138,468   6/1964   Matkovich et al.

OTHER REFERENCES

Rizzo, H. F., et al.: Journal of the American Ceramic Society, p. 550, vol. 43, October 1960.

OSCAR R. VERTIZ, *Primary Examiner.*

G. O. PETERS, *Assistant Examiner.*